March 12, 1940.        J. Y. BLAZEK ET AL        2,192,888
RESURFACING MACHINE
Filed Aug. 26, 1938         2 Sheets-Sheet 2

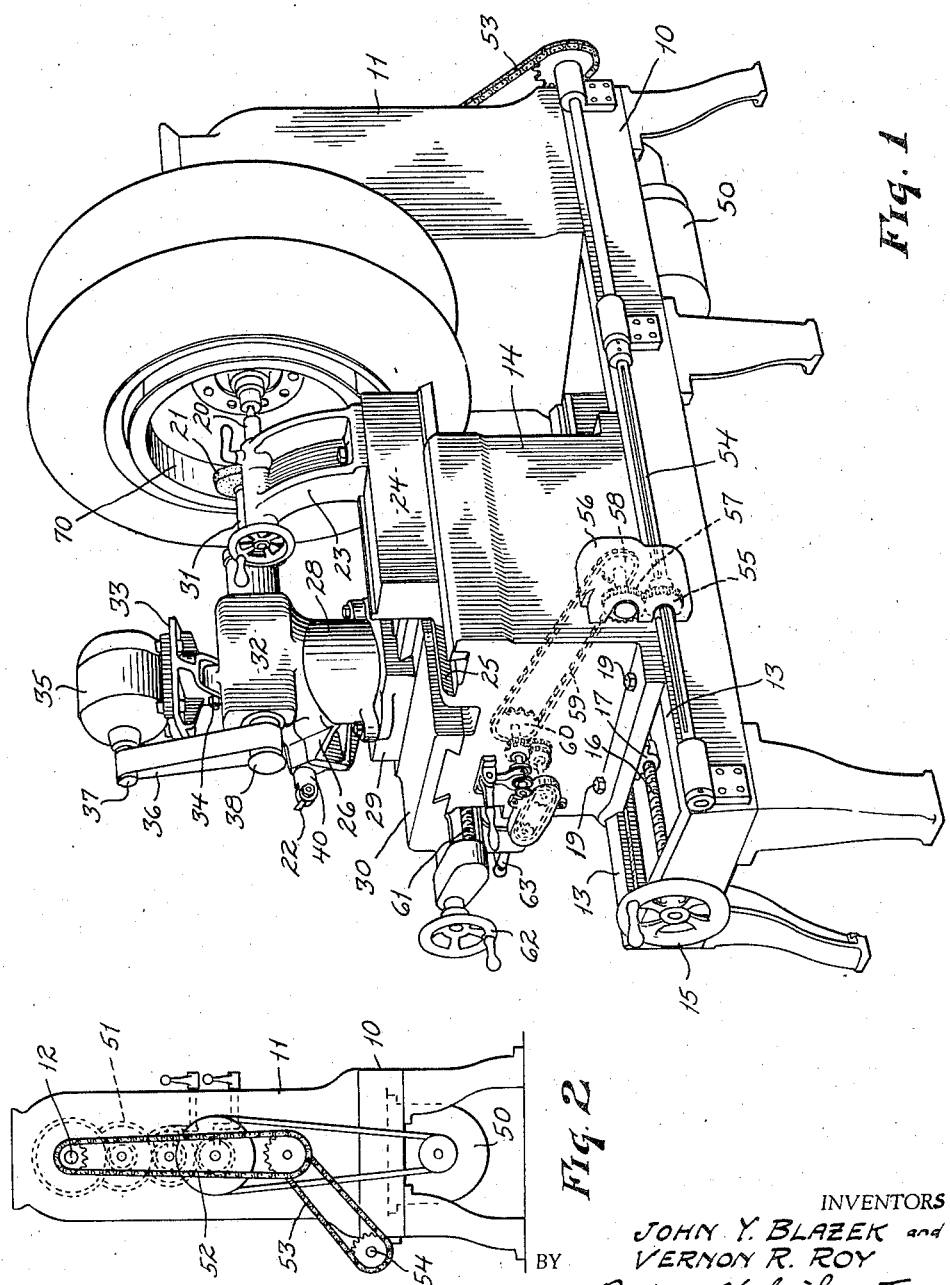

INVENTORS
JOHN Y. BLAZEK and
VERNON R. ROY
BY Bates, Gohrick, & Teare
ATTORNEYS

Patented Mar. 12, 1940

2,192,888

UNITED STATES PATENT OFFICE 2,192,888

RESURFACING MACHINE

John Y. Blazek, Maple Heights, and Vernon R. Roy, Cleveland, Ohio, assignors to Lempco Products Inc., Cleveland, Ohio, a corporation of Ohio Application August 26, 1938, Serial No. 226,956

5 Claims. (Cl. 51—50)

This invention relates to a machine by means of which relatively large articles such as brake drums may be resurfaced without requiring the tires to be removed from the rims and without requiring much time for centering the articles in the machine. The machine is equally well adapted for rapidly centering other articles and for rotating them for the purpose of performing work upon them.

Figure 3:
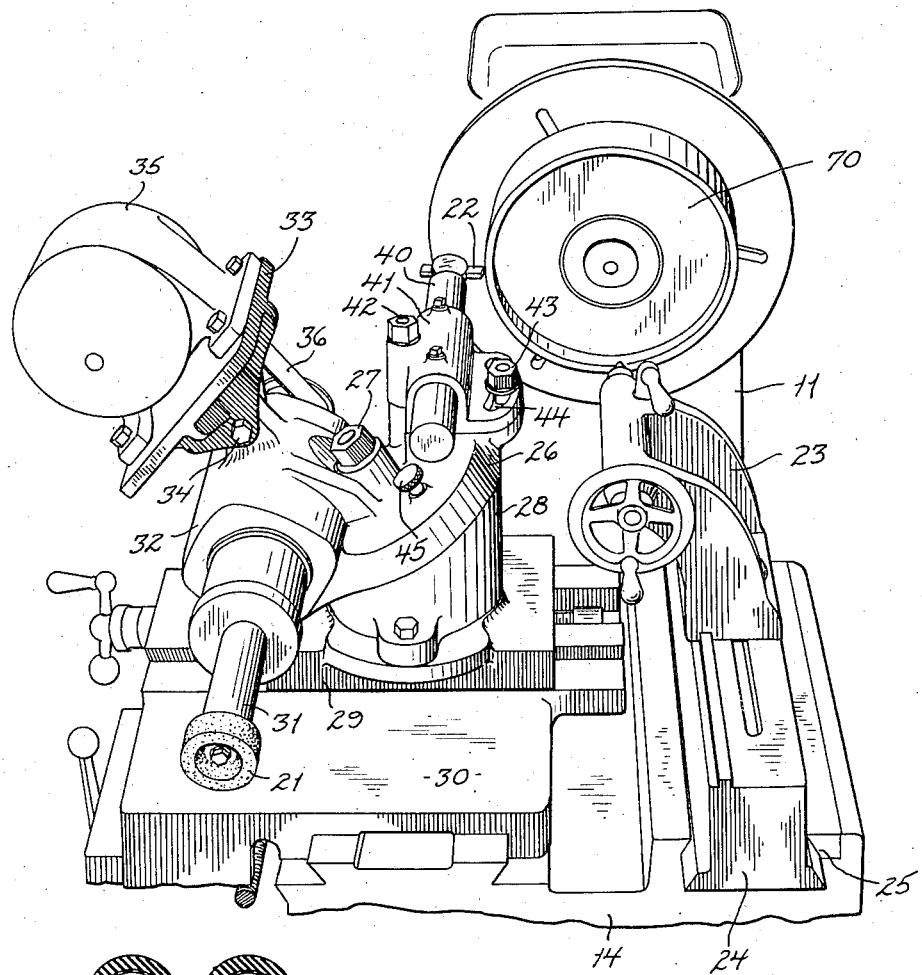
Figure 4:
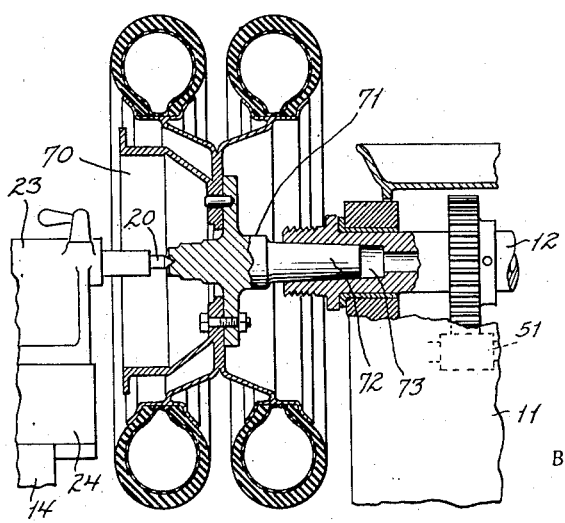

Referring now to the drawings, Fig. 1 is a perspective view of a machine embodying the invention; Fig. 2 is an end view; Fig. 3 is a perspective view of part of the operating mechanism of the machine, and Fig. 4 is a sectional detail.

In Fig. 1, the machine is shown as supporting a dual wheel for the purpose of grinding the brake drum. The difficulty in handling a heavy article of this type and of centering it so that the drum could be satisfactorily ground has increased or entailed a cost that is normally out of proportion to the work performed. The present machine produces the desired result in that it holds the article firmly during the machining operation without chatter of the tool during use.

The machine illustrated has a bed 10, upon which is mounted a standard 11 and within which a work spindle 12 is journalled. The bed has ways 13 upon which a base 14 is supported and is adapted to be moved toward and from the standard 11. The base may be moved along the bed by rotation of a handwheel 15 which is connected to the base by a screw shaft 16 that engages a correspondingly threaded passageway in a bracket 17 that is attached to the bottom of the base. After adjustment, the base may be locked in position by securing members 19.

The base 14 supports a tail spindle 20 together with suitable work performing tools, such as a grind wheel 21 and a cutter 22. The tail spindle is carried in an arm 23 that projects upwardly from a carriage 24 which in turn is movable in ways 25 along the top of the base. The ways 25 are offset from the axis of the work spindle to provide adequate clearance for the cutting tools.

In Fig. 1, as heretofore stated, the work performing tool includes a grinding head and a turning tool or cutter. These are mounted upon a turret 26, the axis of which is indicated at 27 as being inclined to the vertical, whereby the turret is swivelly mounted on an oblique plane. The turret rests upon a base 28 that is preferably swivelly mounted for movement in a horizontal plane upon a cross slide 29. A carriage 30 supports the cross slide and is in turn supported by the base 14 for movement longitudinally of the bed 10.

By spacing the base 14 and its associated mechanism from the standard 11 there is obtained ample space for supporting large articles that are to be resurfaced. Moreover the work performing tools are in a position where they can be readily used or moved quickly out of the way for the purpose of replacing the article to be resurfaced. As heretofore stated, the tools that are illustrated in the present embodiment comprise a grinding wheel and a cutter, but it is to be understood that the tools are not necessarily limited to the particular items shown. Insofar however as they are illustrative, the grinding wheel 21 is shown as being mounted upon a shaft 31 which is journalled in a bearing block 32 that forms part of the turret. The block is shown as supporting a motor base 33 through a pivotal connection 34 upon which a motor 35 is adapted to be fastened. A belt 36 connects the motor shaft 37 through a pulley wheel 38 on the grind wheel shaft 31 for transmitting rotary motion to the grind wheel. The pivotal connection 34 allows the motor to be swung in an arc whenever desired for the purpose of adjusting the tension on the belt 36.

The cutter 22 is shown as being mounted in a tool carrier 40 which is shown in the form of a bar that extends through a passageway in a clamp 41. The clamp, in turn, is adapted to be adjustably positioned upon the turret by securing members 42 and 43, and in the preferred arrangement, the clamp may be pivoted about the axis of the member 40 for positioning the cutter at any desired angle with reference to the work. For this purpose the base of the clamp has an arcuate slot 44 through which the securing member 43 extends. In Fig. 1, the grinding wheel is shown in contact with the work while in Fig. 3, the cutter is shown in contact with the work. The turret therefore is turnable through 180-degrees to present the desired tool to the work, and for this purpose there is an indexing button 45 which enables the turret to be indexed quickly with reference to its base.

For operating the various resurfacing tools by power, there is shown a motor 50 which is suitably connected through reduction gearing indicated in general at 51 to the work spindle 12. Additionally the motor is connected by suitable mechanism such as the belts 52 and 53 to a shaft 54 that extends longitudinally of the bed and is journalled therein.

For transmitting motion from the shaft 54 to the carriage 30 and thereby to move the carriage 30 with reference to the base 14, there is shown a gear 55 which is splined to the shaft and which is mounted within a housing 56 that is carried by the base 14. The housing is also shown as having within it a gear 57 which meshes with the gear 55 for operating a sprocket wheel 58 around which a sprocket chain 59 extends. The chain operates the sprocket wheel 60 and this in turn, through suitable gearing, operates the screw shaft 61 which controls the movement of the carriage with reference to the base 14. If desired, a suitable hand wheel 62 may be used to operate the shaft 61 and for this purpose, a clutch in the drive mechanism is provided under the control of the handle 63.

To use the machine, the article 70 to be resurfaced is mounted in place between the work and tail spindles, the base is clamped to the bed and the surfacing tool that is to be used is positioned as closely as possible to the work and thereupon the motor 50 is started. This causes the work to rotate in one direction and to advance the carriage 30 longitudinally of the bed for feeding the tool axially of the article. The work may be quickly centered within the live spindle by means of an arbor 71, the shank 72 of which is adapted to enter an aperture 73 in the end of the work spindle.

A machine made in accordance with the present invention is well adapted for quickly centering large articles and for performing work on the surface thereof. There is ample space within which the article may turn and yet it may be rigidly held so as to avoid chattering of the tool during use.

We claim:

1. In combination, a frame comprising a bed, a standard thereon, a work spindle journalled in the standard, a base movable along the bed toward and from the standard, a slide mounted on the base and movable toward and from the standard, a work spindle supported by the slide, a carriage also supported on the base and movable independently of the slide toward and from the standard, a cross slide on the carriage, a turret carried by the cross-slide, work engaging tools mounted on the turret and including a grinding unit and a cutting tool, and indexing means on the turret for positioning it at predetermined locations with reference to the cross slide.

2. In a machine of the character described, the combination of a frame having a bed, a standard thereon, a work spindle journalled in the standard, a base supported on the bed for movement longitudinally thereof toward and from the standard, means on the base for engaging work and centering it with reference to the work spindle, and other means normally mounted on the base for supporting a cutting tool, said means including a carriage and a cross-slide, a turret on the cross slide, the turret being mounted for movement about an axis that extends obliquely to the vertical.

3. A machine of the character described comprising in combination, a frame comprising a bed, a work spindle, means for supporting the work spindle on the bed, a base movable along the bed, a slide movable along the base and offset from the axis of the work spindle, a tail spindle carried by the slide, a carriage movable along the base, parallel to the direction of movement of the slide, a cross slide on the carriage, a turret supported on the cross slide and having its axis disposed at an angle to the vertical, work performing tools mounted on the turret, one of the tools including a grinding wheel and a motor operatively connected thereto, a second motor operatively connected to the work spindle, a shaft journalled in the bed, means for operatively connecting the shaft to the last named motor and other means for operatively connecting the shaft to the carriage.

4. A machine of the character described comprising in combination a bed, a work spindle, means for supporting the work spindle upon the bed, a base movable along the bed, a tail stock carried by the base and movable with reference to it, a carriage also mounted on the base and movable with reference to it, a cross-slide on the carriage, a member swivelly mounted on the cross-slide for movement in a horizontal plane, a turret swivelly mounted on the member for movement in an oblique plane, a work performing tool mounted on the turret, a motor for operating the work spindle and means operatively connecting the motor to the work spindle and to the carriage.

5. In combination, a frame having a bed, a standard supported on the bed, a work spindle journalled in the standard, a base movable along the bed toward and from the standard and having guiding means thereon, the guiding means being offset from the axis of the work spindle but extending parallel with said axis, a carriage mounted for movement along the guiding means and adapted to overhang the end of the base, a tail spindle mounted in a bracket which is adjustably mounted on said carriage, and other means on the base for holding a work performing tool.

JOHN Y. BLAZEK.
VERNON R. ROY.